United States Patent [19]
Rehm et al.

[11] Patent Number: 5,328,306
[45] Date of Patent: Jul. 12, 1994

[54] TOOL SPINDLE, IN PARTICULAR BORING SPINDLE

[75] Inventors: Karl Rehm, Mindelheim; Markus Grob, Bad Wörishofen, both of Fed. Rep. of Germany

[73] Assignee: Grob-Werke GmbH & Co. KG, Mindelheim, Fed. Rep. of Germany

[21] Appl. No.: 42,599

[22] Filed: Apr. 2, 1993

[30] Foreign Application Priority Data

Apr. 2, 1992 [DE] Fed. Rep. of Germany ....... 4210898

[51] Int. Cl.[5] .............................................. B23B 41/04
[52] U.S. Cl. ..................................... 408/125; 82/1.3; 409/231
[58] Field of Search ................... 82/1.3, 18; 408/124, 408/125; 409/231

[56] References Cited

U.S. PATENT DOCUMENTS

| | | | |
|---|---|---|---|
| 2,751,800 | 6/1956 | Beach | 82/1.3 |
| 3,494,388 | 2/1970 | Sanders et al. | 142/16 |
| 3,593,603 | 7/1971 | Gellert | 82/18 |
| 3,803,981 | 4/1974 | Allgeyer | 408/124 |
| 5,036,928 | 8/1991 | Mark | 408/124 |

FOREIGN PATENT DOCUMENTS

| | | |
|---|---|---|
| 3837172 | 5/1989 | Fed. Rep. of Germany ......... 82/13 |
| 1474770 | 3/1967 | France . |
| WO88/08346 | 11/1988 | World Int. Prop. O. . |

*Primary Examiner*—Steven C. Bishop
*Attorney, Agent, or Firm*—Jacobson, Price, Holman & Stern

[57] ABSTRACT

A tool spindle for machining or producing elliptical surfaces, particularly elliptical bores, includes a housing (1) of two parts (31 32), a sleeve (2) rotatable mounted in the housing, a tool carrier shaft (3) rotatably mounted in the interior of the sleeve (2) for carrying a machining tool on the outer end thereof, the tool carrier shaft having an axis of rotation (13) in parallel spaced relationship with respect to the axis of rotation (12) of the sleeve, and a drive mechanism (4, 5, 6, 7, 8, 9, 11, 18, 21, 30) for driving the tool carrier shaft and the sleeve at the same speed in opposite directions.

19 Claims, 5 Drawing Sheets

TOOL SPINDLE, IN PARTICULAR BORING SPINDLE

BACKGROUND OF THE INVENTION

The invention relates to a tool spindle, in particular a boring spindle for boring bores of elliptical cross-section.

Bores normally have a circular cross-section. In certain cases, however, it is desirable to produce bores the cross-section of which deviates from the circular, and specifically bores which have an elliptical cross-section. Bores of this shape have the advantage that with the same cross-section the dimensions in the direction of the short semi axis are smaller.

The object of the invention is to provide a tool spindle by means of which it is possible to produce elliptical bores of this type. Here, the tool spindle according to the invention serves primarily as a boring spindle. However, it is also possible to use the same tool spindle or one with only slight alterations as, for example, a support for grinding tools or other tools for machining bores of elliptical cross-section.

BRIEF SUMMARY OF THE INVENTION

The tool spindle according to the invention is characterized in that there is mounted in a housing a sleeve which in turn receives a shaft as a tool carrier. The sleeve and the shaft are driven at the same speed but in opposite directions, the axes of rotation of the sleeve and of the shaft running parallel to one another but at a spacing from one another.

With the tool spindle according to the invention, the tool which is carried by the shaft describes an elliptical path, one rotation of the shaft corresponding to one complete elliptical path. The spacing of the axes of the shaft and of the sleeve thereby determines the extent of eccentricity, i.e. the difference between the two semiaxes of the ellipse. Here, the spacing corresponds to half the eccentricity.

The elliptical movement of the tool which is carried by the shaft is effected in that the shaft axis revolves on a circular path, in particular in the opposite direction to the rotary movement of the shaft itself. Thus, there occurs in fact an addition of the spacing between the two axes mentioned which, after an angular movement of 90°, corresponds to a mutual cancellation. An elliptical movement is thus obtained in which, after an arc of 90°, the long semi axis and the short semi axis of the ellipse adjoin one another.

The most significant advantage of the invention consists in the relatively simple construction which produces the elliptical movement.

The two drives, i.e. the drive of the sleeve and the drive of the shaft, can be electrically coupled to one another such that each of the two elements has an electric motor and the two electric motors operate at exactly the same speed, for example through synchronizing devices or other known means. It is thereby merely necessary to select the directions of rotation appropriately.

In another variant of the tool spindle according to the invention, a common mechanical drive is provided for the sleeve and the shaft. A common motor is therefore used to drive both the sleeve and the shaft. Since the sleeve is mounted in the relatively fixed housing, driving this sleeve mechanically does not create any particular problems. However, owing to the eccentric mounting of the shaft in the sleeve, the rotation of the shaft axis has to be taken into account in driving the shaft. This can be effected in a very simple constructional design by driving the shaft by means, for example, of a Cardan shaft which permits the eccentric movements of the shaft carrying the tool. This Cardan shaft extends substantially in the direction of the axis of the shaft or the sleeve.

In the invention, however, an arrangement is preferred in which a gear housing revolves together with the driven sleeve, a gear shaft having two toothed wheels being rotatably mounted in the gear housing, substantially axially parallel to the sleeve and shaft axes. One toothed wheel of the gear shaft meshes with a stationary central wheel, the axis of which is aligned coaxially with respect to the sleeve axis, while the other toothed wheel of the gear shaft acts on a toothed wheel which is arranged on the shaft serving as a tool carrier and which revolves coaxially together with this toothed wheel.

The arrangement according to the invention has a construction similar to a planetary gear. It fulfills the essential requirements of the invention, which consist in driving the shaft and the sleeve in opposite directions at the same speed and in mounting the shaft eccentrically in the sleeve. Running in opposite directions is obtained by the cooperation of the revolving gear shaft with the central wheel, the direction of rotation of the gear shaft corresponding to the direction of rotation of the sleeve. However, in the action on the toothed wheel on the shaft, this toothed wheel is driven in the opposite direction. By appropriately calculating the number of teeth on the different cooperating toothed wheels, a precise, equivalent countermovement of the shaft with respect to the sleeve can easily be achieved. The proposal according to the invention also solves the problem of driving the shaft mounted eccentrically in the sleeve. With a suitable arrangement, it can easily be achieved that the gear shafts also revolve about the axis of the tool carrier shaft.

The invention specifically provides that two gear shafts each having a pair of toothed wheels be mounted in the gear housing, the plane containing the two gear shaft axes intersecting the plane containing the axes of the sleeve and tool carrier the shaft. Such an arrangement fulfills all the necessary geometric conditions.

It is also possible for the axes of the gear shafts to be arranged to be offset by 180° with respect to the sleeve axis, so that substantially only turning moments, and no other forces are to be transmitted.

In one proven embodiment of the invention, the revolving gear housing is provided with a neck-like extension which receives the mounting for the shaft of the stationary central wheel, this central wheel shaft being fixed at its end opposite the central wheel. It is favorable for this fixing to be adjustable. The alignment of the semiaxes of the desired ellipse can be determined in this way. It is therefore not strictly necessary to arrange the workpiece such that the ellipse to be produced has the desired alignment with respect to the workpiece. It is also possible to appropriately align the tool spindle alone.

It is favorable for a drive plate to be set on the neck-like extension. The rotary movement is transmitted to the sleeve, and thence to the shaft by way of this drive plate.

According to a further feature of the invention, the housing is constructed in two parts. A first tubular part is associated with the tool and preferably receives the mountings for the sleeve and the shaft. A second housing-type part encloses the revolving gear housing.

The invention is described above with respect to a tool spindle in which the tool, carried by the shaft is preferably intended to produce or to machine a bore.

However, the inventive idea can also be used specifically to produce an elliptical external contour. To this end, the invention proposes a tool for producing and machining surfaces of elliptical cross-section, which tool is characterized in that there is provided a central supporting body on which there revolves a sleeve which serves as a supporting mounting for a revolving tool carrier, the sleeve and the tool carrier being driven at the same speed but in opposite directions, and the axes of rotation of the sleeve and of the tool carrier running parallel to one another but at a spacing from one another. Thus, a tool carrier which revolves on a comparatively large diameter and describes elliptical paths is obtained, so that a tool of this type can also be used for example for elliptical external contours or indeed internal contours of large dimensions.

DESCRIPTION OF PREFERRED EMBODIMENT

Figure 1:
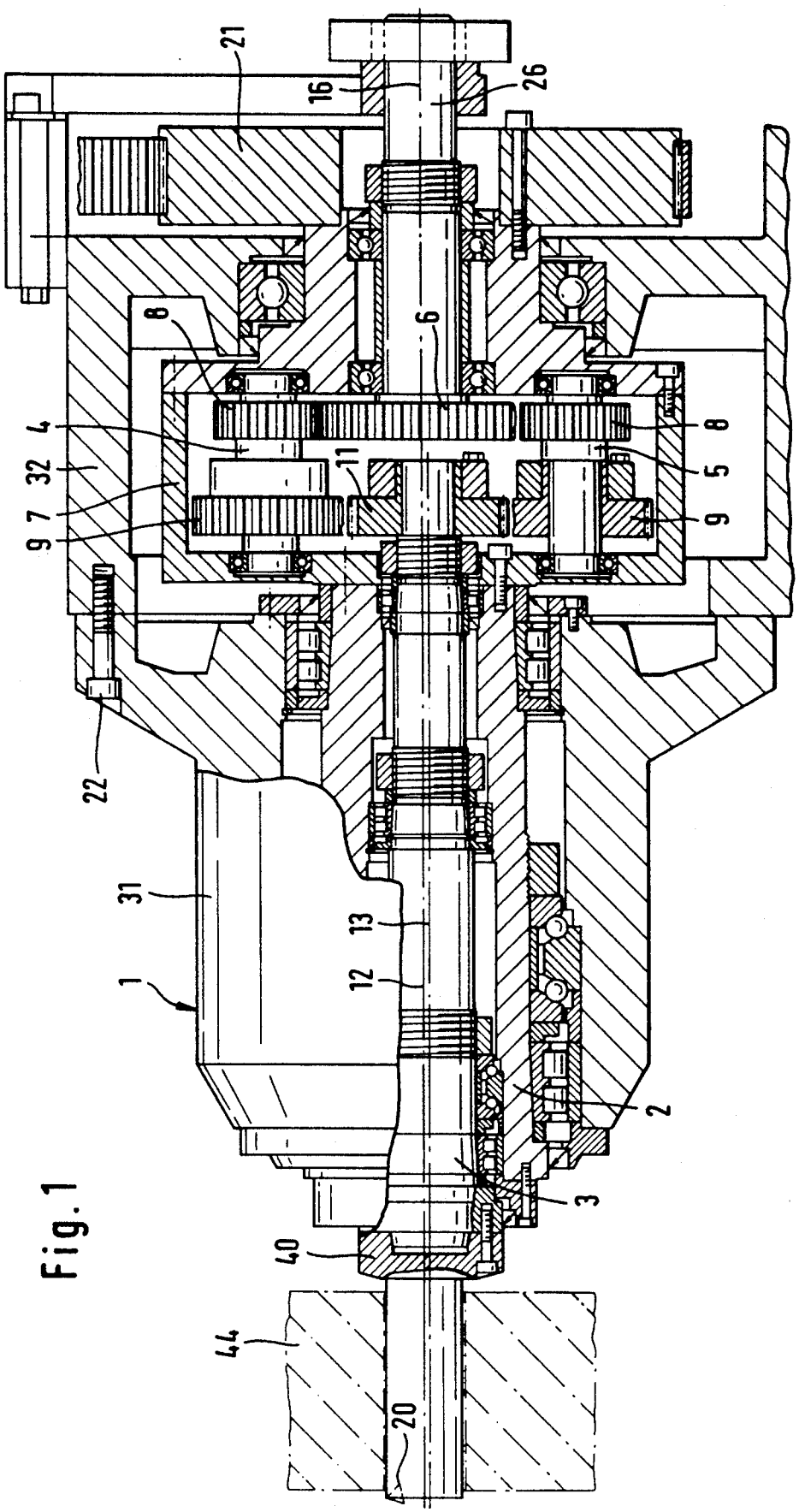
FIG. 1 is a cross sectional view of a tool spindle according to the invention.
Figure 2:
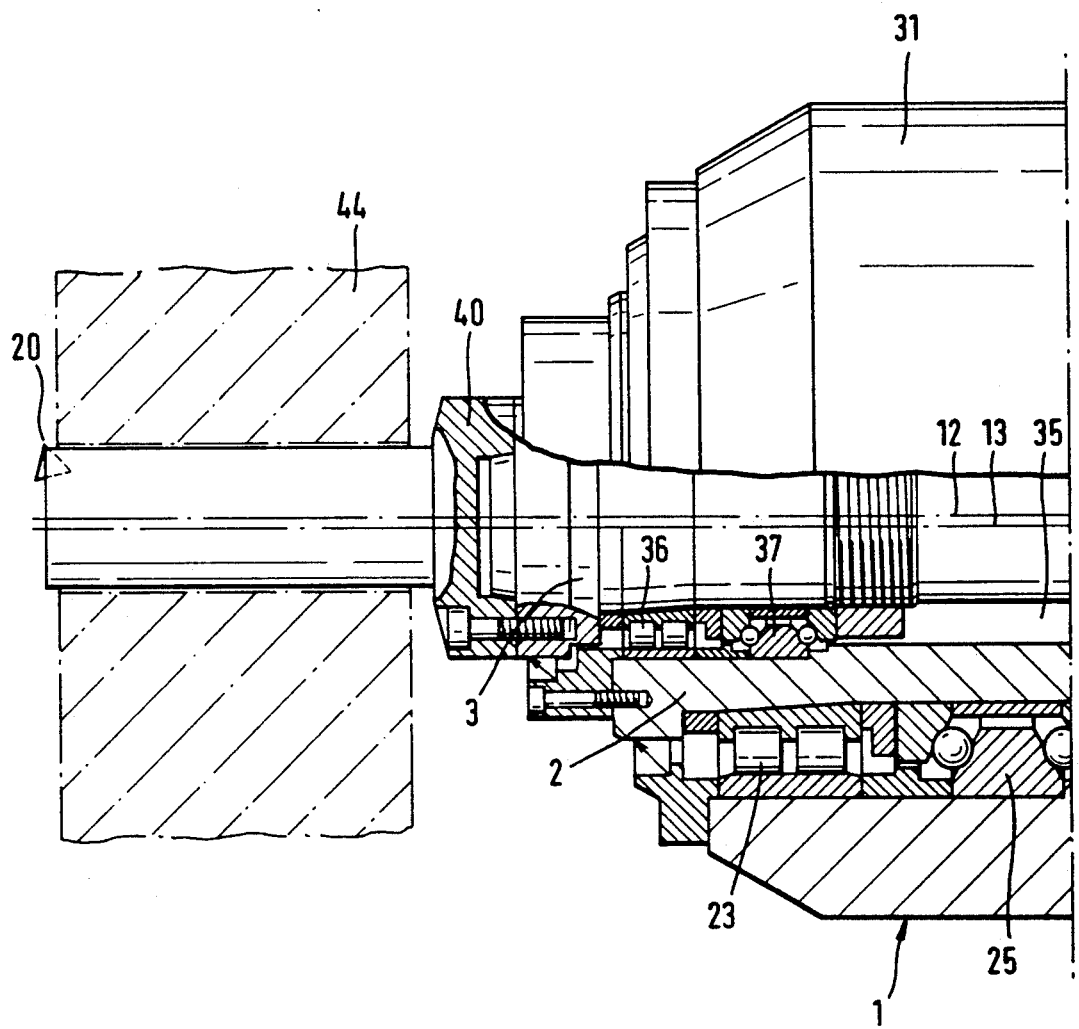
FIG. 2, FIG. 3 and FIG. 4 are each partial cross-sectional views which show respectively the front, the central and the rear parts of the tool spindle of FIG. 1, on a larger scale.
Figure 3:
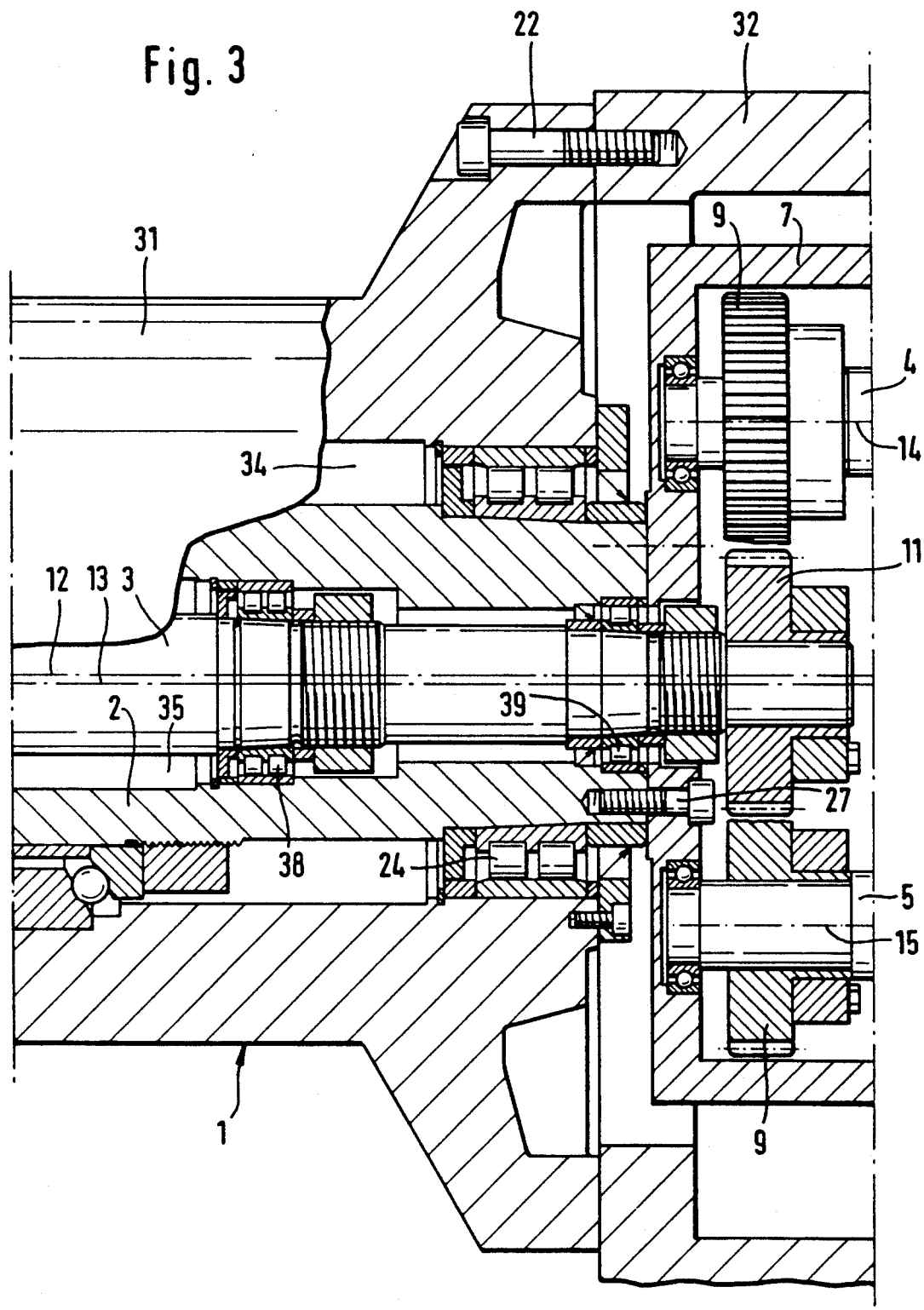
Figure 4:
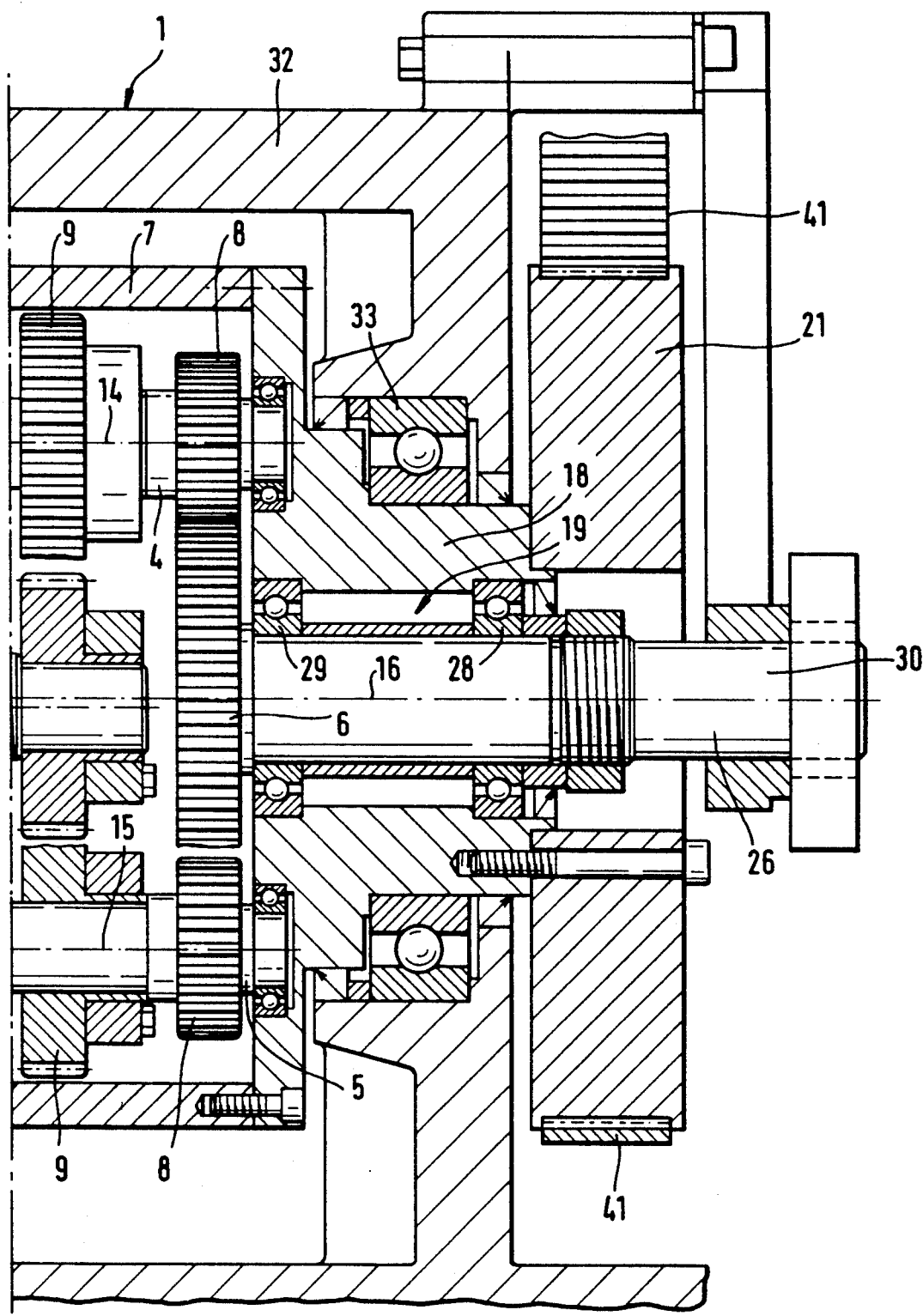

In the tool spindle shown, an outer housing 1 which comprises the parts 31 and 32. These two parts are connected fixedly to one another, for example by means of screws 22. The part 32 is part of a larger housing by means of which the tool spindle according to the invention is connected to a machine tool.

The part 31 has an approximately tubular construction and substantially receives a sleeve 2, while the part 32 encloses a revolving gear housing 7.

The sleeve 2 is held in the housing 1 by radial bearings 23,24 and by axial bearings 25. The sleeve axis is designated 12.

The revolving gear housing 7 is mounted on the sleeve 2 by means of screws 27. This gear housing is closed by means of a neck-like extension 18. Two gear shafts 4,5 are freely rotatably mounted in the revolving gear housing 7. Each of the gear shafts 4,5 has a pair of toothed wheels 8,9, which are rigidly mounted on the gear shafts 4,5 respectively.

Each toothed wheel 8 of the gear shafts 4,5 meshes with a central wheel 6 which is supported in a mounting 19 in the neck-like extension 18. This mounting 19 substantially comprises two roller bearings 28,29. The axis 16 of the central wheel 6 runs coaxially with respect to the sleeve axis 12. The end 30 of the shaft 26 of the central wheel 6 is fixed non-rotatably to the part 32 of the housing 1. However, this fixing can be released if required, in order to rotate the alignment of the semiaxes of the ellipse to be produced about the axes 12,13.

The axis 13 is the axis of the shaft 3 which runs in the interior of the sleeve 2, eccentric to the axis 12.

Figure 5:
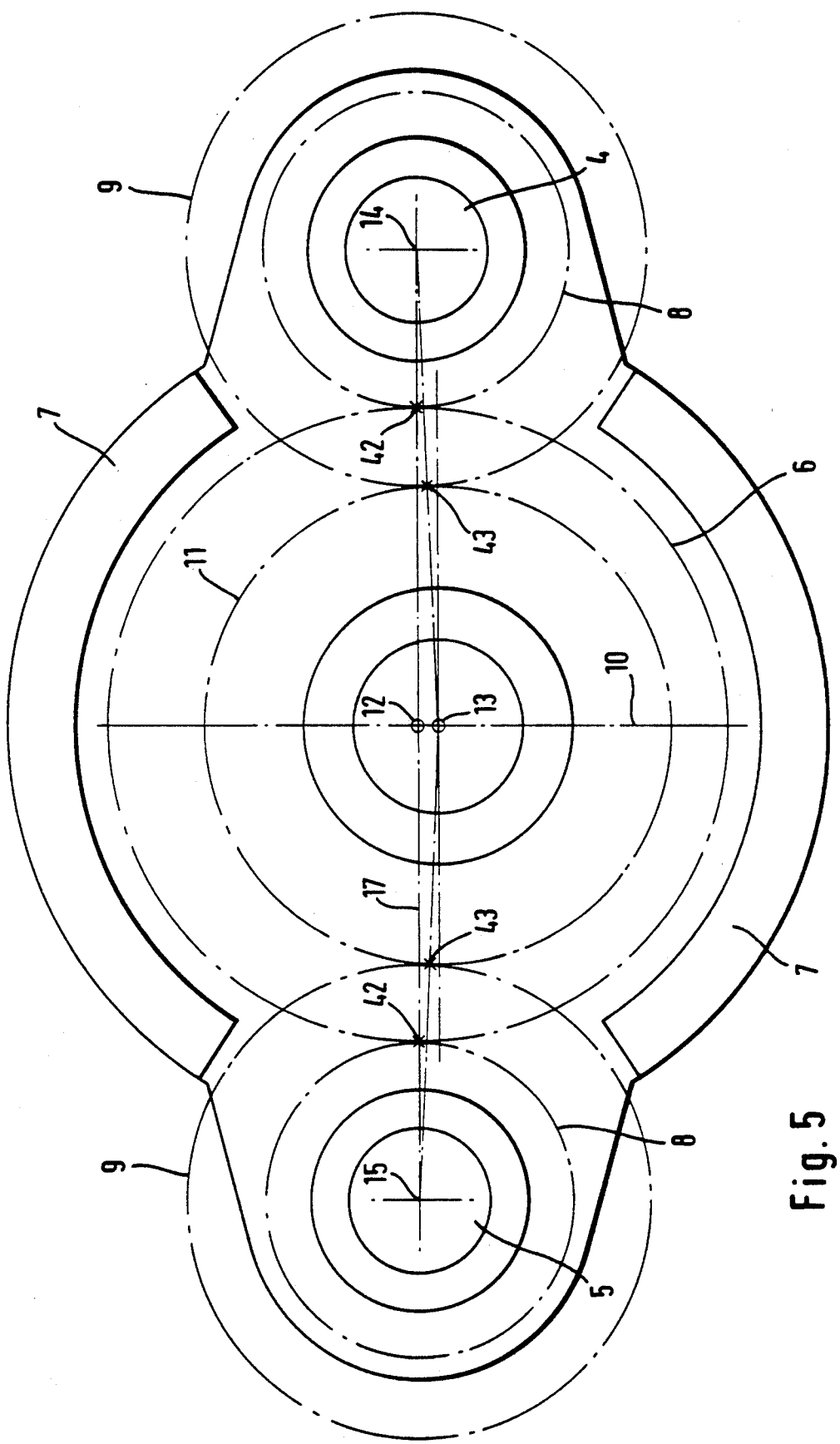
FIG. 5 is a schematic view of a revolving gear housing forming part of the tool spindle of FIG. 1.

It will be noted that in the diagrammatical illustrations of FIGS. 1 to 4 both the gear shafts 4,5 and the eccentric offsetting of the shaft 13 with respect to the shaft 12 are shown in the plane of the drawing. However, FIG. 5 shows clearly that this only serves the purpose of illustration. In a practical embodiment, the plane to which the axes 12,13 belong and the plane to which the axes of the two gear shafts 4,5 belong intersect at right angles.

The neck-like extension 18 is in turn additionally supported by way of a bearing 33 in the housing part 32.

While the sleeve 2 is arranged in a bore 34 in the housing 1, the shaft 3 is accommodated in a bore 35 in the sleeve 2. The axis 13 is associated with this bore 35. The elements for mounting the shaft 3 in the sleeve 2 are designated 36 to 39. The bearings 36,38,39 are radial bearings, and the bearing 37 takes up the axial forces.

The shaft 3 has a holding element 40 which carries the cutting tool 20. The workpiece is designated 44. At the end remote from the tool 20, the toothed wheel 11 is rigidly connected to the shaft. This toothed wheel 11 meshes with the two toothed wheels 9 of the gear shafts 4,5.

A drive plate 21 is provided for driving the sleeve 2. This drive plate 21 can, for example, be a toothed belt plate for the toothed belt 41. However, other known means, such as toothed wheels, V-belts or the like can also be used for driving the sleeve 2.

In the embodiment shown, driving of the shaft 3 is derived from driving of the sleeve 2. The toothed wheels 8 which revolve together with the sleeve 2 mesh with the central wheel 6, rotate about the associated axes 14,15 and at the same time revolve together with the sleeve in the same direction, and also the toothed wheels 8,9 on the gear shafts 4,5 have the same direction of rotation as the sleeve 2, since wheels 8 roll against the central wheel 6. However, when the toothed wheels 9 cooperate with the toothed wheel 11, a counter-directed rotary movement occurs for the toothed wheel 11, so that the shaft 3 rotates in the opposite direction.

FIG. 5 shows an enlarged illustration of a schematic view of the interior of the revolving gear housing, the various toothed wheels being shown only by broken circles or rolling circles.

The rolling points between the central wheel 6 and the toothed wheels 8 are designated 42 and the rolling points between the toothed wheels 9 and the toothed wheel 11 on the shaft 3 are designated 43.

In the embodiment shown, the axes 14 and 15 are diametrically opposite with respect to the axis 12 of the sleeve 2 by 180°. The shaft axis 13 is offset by a specific amount with respect to the sleeve axis 12. When the gear shaft axes 14 and 15 revolve, the toothed wheels 8 cooperate with the central wheel 6 and the toothed wheels 9 cooperate with the toothed wheel 11 of the shaft 3. The plane 17 on which the axes 14 and 15 lie intersects the plane on which the axes 12 and 13.

We claim:
1. Tool spindle comprising:
   a housing;
   a sleeve rotatably mounted in said housing;
   a tool carrier shaft at least partly received within and relatively rotatable with respect to said sleeve for acting as a tool carrier, said sleeve and said tool carrier shaft each having a respective axis of rotation extending in parallel spaced relationship with respect to each other; and drive means adapted to rotate said sleeve and said tool carrier shaft at equal speeds in opposite directions, said drive means comprising a gear housing rotatable with said sleeve, at least one gear shaft rotatably mounted within said gear housing and having an axis of rotation substantially parallel to said axes of rotation of said sleeve and said tool carrier shaft;

first and second toothed wheels fixedly mounted on said at least one gear shaft, a further toothed wheel mounted on said tool carrier shaft for rotation coaxially therewith, sand a stationary central gear wheel having an axis of rotation coaxial with said axis of rotation of said sleeve, said first toothed wheel meshing with said central gear wheel and said second toothed wheel meshing with said further toothed wheel.

2. The tool spindle as claimed in claim 1 and further comprising:

a neck-like extension on said gear housing;

a central wheel shaft in said neck-like extension having a first end and a second end, said stationary central wheel being mounted on said first end and said central wheel shaft being fixed at its second end; and means for mounting said central wheel shaft in said neck-like extension for relative rotation between said gear housing and said central wheel shaft.

3. The tool spindle as claimed in claim 1 wherein said drive means further comprises:

a neck-like extension on said gear housing; and a drive plate mounted on said neck-like extension.

4. The tool spindle as claimed in claim 2 wherein said drive mans further comprises:

a drive plate mounted on said neck-like extension.

5. The tool spindle as claimed in claim 1 wherein:

said housing comprises a first tubular part in which said sleeve is mounted, and a second housing-like part enclosing said gear housing.

6. The tool spindle as claimed in claim 1 wherein:

said at least one gear shaft comprises a first gear shaft and a second gear shaft;

said first and second toothed wheels comprise a first and a second toothed wheel mounted on each of said first and second gear shafts, respectively;

said first and second gear shafts each have an axis of rotation lying in a first plane;

said axes of rotation of said sleeve and said tool carrier shaft lie in a second plane; and said first plane intersects said second plane.

7. The tool spindle as claimed in claim 6 wherein:

said axes of rotation of said first and second gear shafts are relatively circumferentially displaced 180° with respect to each other around said axis of said sleeve.

8. The tool spindle as claimed in claim 1 wherein:

said drive mean comprises a first drive means for rotating said sleeve and a second drive means for rotating said tool carrier shaft; and said first and second drive means are electrically coupled.

9. The tool spindle as claimed in claim 2 wherein:

said drive means further comprises a first drive means for rotating said sleeve and a second drive means for rotating said tool carrier shaft; and said first and second drive means are electrically coupled.

10. The tool spindle as claimed in claim 1 wherein:

said drive means comprises a common mechanical drive means for said sleeve and said tool carrier shaft.

11. The tool spindle as claimed in claim 2 wherein:

said drive means comprise a common mechanical drive means for said sleeve and said tool carrier shaft.

12. The tool spindle as claimed in claim 1 and further comprising:

a cutting tool mounted on said tool carrier shaft so that with rotation of said sleeve and tool carrier shaft by said drive means said tool spindle comprises a boring spindle for boring holes of elliptical cross-section.

13. A tool spindle comprising:

a housing;

a sleeve rotatably mounted in said housing;

a tool carrier shaft at least partly received within and relatively rotatable with respect to said sleeve for acting as a a respective axis of rotation extending in parallel spaced relationship with respect to each other; and drive means adapted to rotate said sleeve and said tool carrier shaft at legal speeds in opposite directions, said drive mean comprising a gear housing, a first gear shaft and a second gear shaft mounted in said gear housing, a first toothed gear wheel and a second toothed gear wheel mounted on each of said first and second gear shafts, said first and second gear shafts each having an axis of rotation lying in a first plane, said axes of rotation of said sleeve and said tool carrier shaft lying in a second plane, intersecting said first plane.

14. The tool spindle as claimed in claim 13 wherein:

said axes of rotation of said first and second gear shafts are relatively circumferntially displaced 180° with respect to each other around said axis of said sleeve.

15. A tool spindle comprising:

a housing;

a sleeve rotatably mounted in said housing;

a tool carrier shaft at least partly received within and relatively rotatable with respect to said sleeve for acting as a tool carrier, said sleeve and said tool carrier shaft each having a respective axis of rotation extending in parallel spaced relationship with respect to each other; and drive means adapted to rotate said sleeve and said tool carrier shaft in opposite directions at the same speed for elliptical boring and machining.

16. The spindle as claimed in claim 15 wherein said drive means comprises:

first drive means for rotating said sleeve; and second drive means for rotating said tool carrier shaft, said first and second drive means being electrically coupled.

17. The tool spindle as claimed in claim 15 wherein:

said drive means comprises a common mechanical drive means for said sleeve and said tool carrier shaft.

18. The tool spindle as claimed in claim 15 and further comprising:

a cutting tool mounted on said tool carrier shaft so that with rotation of said sleeve and tool carrier shaft by said drive means said tool spindle comprises a boring spindle for boring holes of elliptical cross-section.

19. A tool for producing or machining surfaces of elliptical cross-section, comprising:
 a central support means;
 a sleeve rotatably mounted on said central support means and having an axis of rotation;
 a tool carrier rotatably mounted on said sleeve so that said sleeve supports said tool carrier and said tool carrier has an axis of rotation extending in parallel spaced relationship to said axis of rotation of said sleeve; and
 drive means adapted for rotating said sleeve and said tool carrier at the same rotational speed in opposite directions for elliptical boring and machining.

* * * * *